(No Model.) 2 Sheets—Sheet 1.

W. J. WALLIS.
AUTOMATIC SEED PLANTER.

No. 414,096. Patented Oct. 29, 1889.

Witnesses
W. C. Coolies
L. M. Freeman

Inventor
William J. Wallis
By L. B. Coupland & Co
Attys

N. PETERS, Photo-Lithographer, Washington, D. C.

(No Model.) 2 Sheets—Sheet 2.
W. J. WALLIS.
AUTOMATIC SEED PLANTER.
No. 414,096. Patented Oct. 29, 1889.
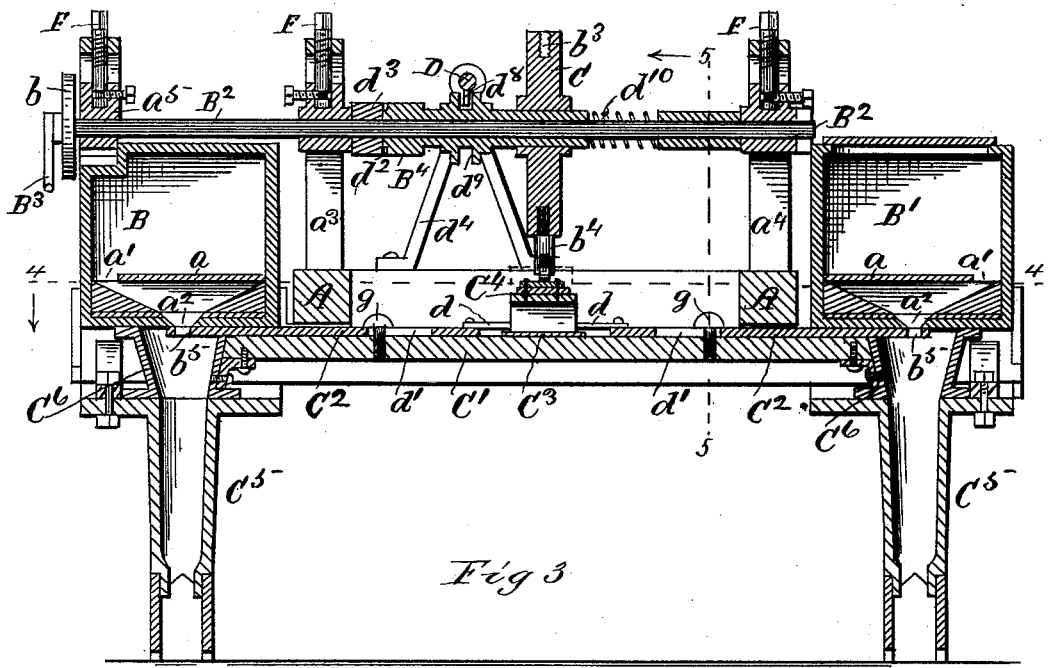
Fig 3.
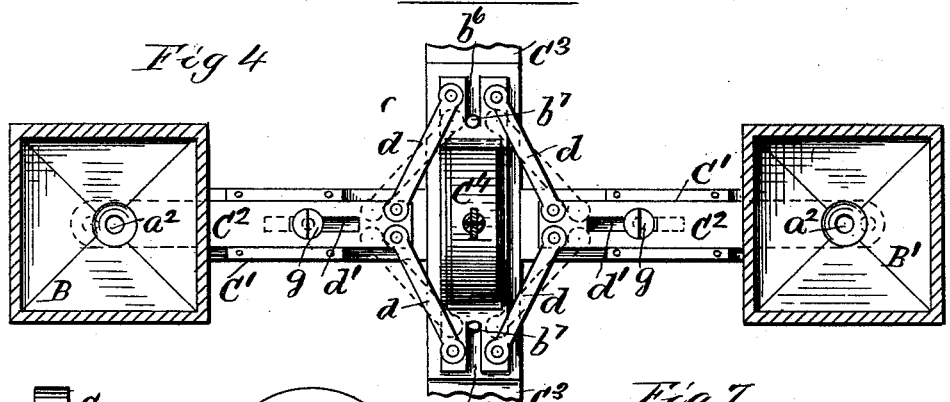
Fig 4.
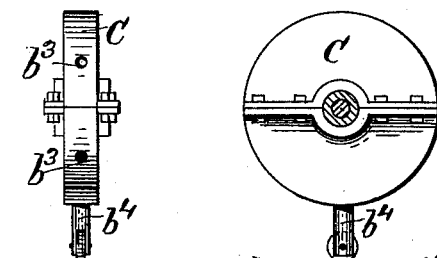
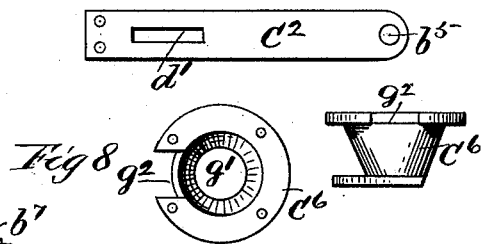
Witnesses
W. C. Corliss
L. M. Freeman
Inventor
William J Wallis
By L. B. Coupland & Co
Attys

UNITED STATES PATENT OFFICE.

WILLIAM J. WALLIS, OF CHICAGO, ILLINOIS, ASSIGNOR OF ONE-HALF TO HENRY WULFF, OF SAME PLACE.

AUTOMATIC SEED-PLANTER.

SPECIFICATION forming part of Letters Patent No. 414,096, dated October 29, 1889.

Application filed January 8, 1889. Serial No. 295,797. (No model.)

*To all whom it may concern:*

Be it known that I, WILLIAM J. WALLIS, a citizen of the United States, residing at Chicago, county of Cook, and State of Illinois, have invented certain new and useful Improvements in an Automatic Seed-Planter, of which the following is a full, clear, and exact description, that will enable others to make and use the same, reference being had to the accompanying drawings, forming a part of this specification.

This invention relates to that class of sulky or wheel planters wherein the seed is dropped in hills or drilled in rows as circumstances may require, and is an improvement on Letters Patent No. 395,674, dated January 1, 1889.

Figure 1:
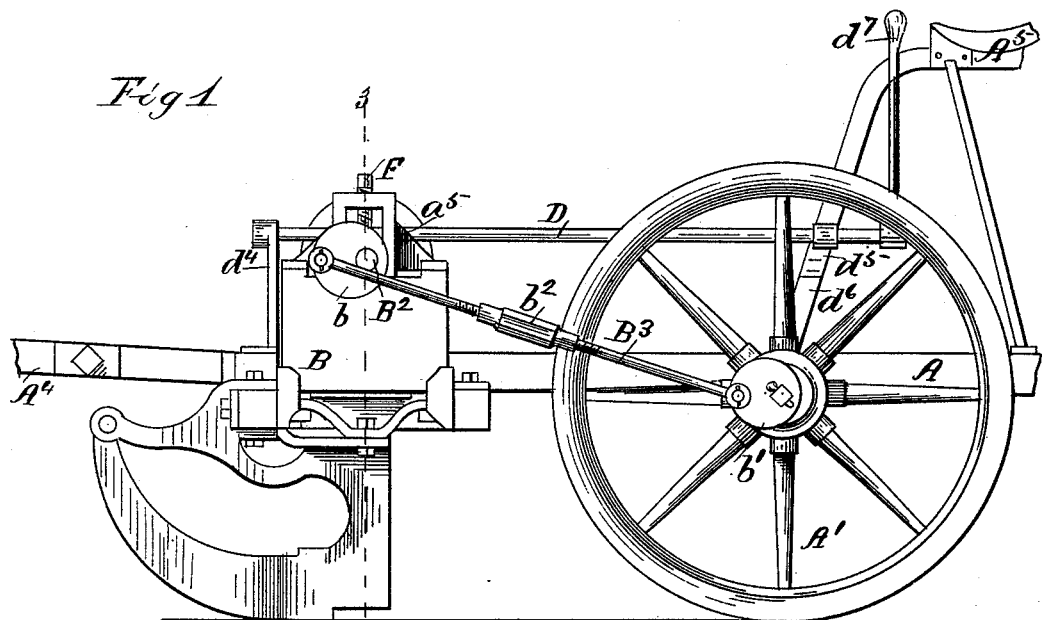
Figure 2:
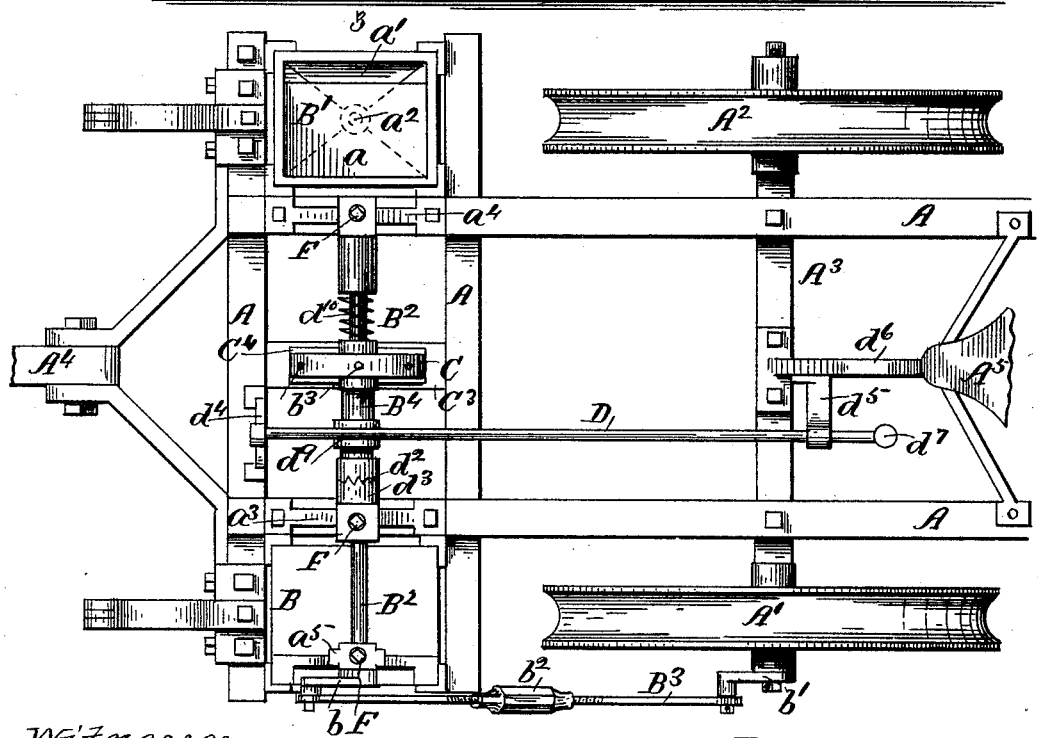

Figure 1 is a side elevation of a planter embodying my improved features; Fig. 2, a plan; Fig. 3, a vertical transverse section in plane 3, Fig. 1; Fig. 4, a horizontal transverse section in plane 4, Fig. 3; Fig. 5, a broken-away section in plane 5, Fig. 3; and Figs. 6, 7, and 8, detached details of construction.

Referring to the drawings, A represents the several parts of the machine-frame; $A'$ $A^2$, the sulky-wheels; $A^3$, the axle; $A^4$, the draft-pole or tongue, and $A^5$ the driver's seat.

The seed-boxes B B' are properly supported on the frame in advance of the sulky-wheels. These boxes are provided interiorly with the diaphragms $a$, located just above the bottom, as shown in Fig. 3. The opening $a'$ at one side provides for the free passage of the seed to the discharge-aperture $a^2$ in the bottom of the seed-boxes. These diaphragms, while not obstructing or retarding the proper delivery of the seed, take off the weight and prevent the passage from the boxes into the delivery-tubes becoming clogged.

The standards $a^3$ $a^4$ are secured to the frame between the seed-boxes, as shown in Figs. 2 and 3. The transverse driving-shaft $B^2$ is provided with journal-bearings in said standards and in the bracket $a^5$, bolted to the seed-box B. On one end of the shaft $B^2$ is eccentrically and rigidly mounted the crank-wheel $b$. A companion crank-wheel $b'$ is in like manner secured to the hub of the sulky-wheel $A'$, as shown in Figs. 1 and 2. These crank-wheels are connected by means of the rod $B^3$, which arrangement provides for the transmission of the required rotary motion to the shaft $B^2$. The connecting-rod $B^3$ is constructed in two parts, the inner adjacent ends being connected by the right and left screw-threaded nut $b^2$, the rod being correspondingly threaded, whereby the same may be shortened or lengthened as practical working requires.

$B^4$ is a sleeve or hollow shaft loosely mounted on the shaft $B^2$ between the supporting-standards $a^3$ $a^4$, as shown in Fig. 3. C is a disk-wheel rigidly mounted on said sleeve. The periphery of this disk-wheel is provided at intervals with a number of apertures $b^3$, (see Figs. 2 and 6,) stopping short therein, for the insertion of one or more projecting pins $b^4$. The horizontal transverse bar $C'$ is on a level with the bottom of the seed-boxes, and extends from one to the other, as shown in Figs. 3 and 4. On the upper side of this bar is rabbeted the endwise-moving slides $C^2$ $C^2$, provided in their outer ends with the aperture $b^5$, (see Fig. 7,) which have a movement across the bottom of the seed-boxes, as shown in Fig. 3 and indicated by dotted lines in Fig. 4. The apertures in the slides register intermittingly with the corresponding openings in the bottom of the seed-boxes and provide for the dropping of the seed at predetermined intervals. On top of the bar $C'$, near its longitudinal center and at right angles thereto, is located the stationary plate $C^3$. On the top of this plate and underneath the disk-wheel C, and in the pathway of the same, is placed the elliptic spring $C^4$. This spring is provided in each end with the slot $b^6$, which bottoms against the stop-posts $b^7$ and limits the endwise movement of spring when compressed.

To the inner ends of the slides $C^2$ $C^2$ are pivoted the inner ends of the four links $d$ $d$ $d$ $d$, the outer ends of said links being pivoted to the respective ends of the elliptic spring, as shown in Fig. 4. Now, as the disk-wheel C is rotated the pin $b^4$, projecting therefrom, comes in contact with and compresses the elliptic spring, which has the effect of drawing the seed-slides inward, and causes the aperture in the outer ends to register with the aperture in the bottom of the seed-boxes and drop the seed. As the pin in the disk-wheel passes on out of contact with the spring, the latter returns to its normal position and moves the slides to close the apertures in the bottom of the seed-boxes. When but one pin is used in the disk-wheel operating the seed-slides, the distance between the hills will be in accordance with the diameter of said wheel. This distance may be increased by using a wheel of a greater diameter.

When it is desired to plant hills closer together or drilled in rows, the number of spring contacting pins set in the periphery of the disk-wheel should be increased accordingly. These pins may be provided in their lower ends with friction-wheels, as shown, to lessen and ease the frictional contact with the elliptic spring.

The seed-slides are provided with the slots $d'$, through which are inserted the stop-screws $g$, the purpose of which is to limit or regulate the throw of said slides.

Between the bottom of the seed-boxes and the seed-delivery tubes $C^5$ is inserted the flanged shoe $C^6$, (see Fig. 8,) whereby these parts are firmly secured together. This shoe is provided with a central opening $g'$ and a portion of the upper flange cut away, as at $g^2$, for the passage of the seed-slides.

The sleeve or hollow shaft loosely mounted on the shaft $B^2$ is provided at one end with the clutch-teeth $d^2$, which engage with a correspondingly-toothed clutch-collar $d^3$, rigidly mounted on the shaft $B^2$. The front end of the horizontal rod D is supported by the standard $d^4$ and the rear end by the bracket $d^5$, secured to the seat-standard $d^6$, as shown in Figs. 1, 2, and 3. The vertical hand-lever $d^7$ is mounted on the rear end of the rod D, and extends upward to and within convenient reach of the driver. Projecting downward from that part of the rod D directly over the sleeve on the shaft $B^2$ is the lug $d^8$, (see Fig. 3,) which rests in the annular groove $d^9$, formed in said sleeve. By rocking the rod D the sleeve is thrown out of engagement with the clutch-collar and the movement of the disk-wheel and dropping mechanism stopped. The spiral spring $d^{10}$, coiled on the shaft $B^2$, serves to hold or normally return the sleeve into engagement with the clutch-collar. The screw-bolts F provide for a vertical adjustment of the shaft B and its journal-bearings in accordance with the diameter of the disk-operating wheel. When the shaft is raised, the connecting-rod $B^3$ should be lengthened accordingly by means of the nut $b^2$ and shortened when said shaft is lowered.

Having thus described my invention, what I claim, and desire to secure by Letters Patent, is—

1. In a planting-machine, the combination, with the driving-shaft, of a sleeve-hub loosely mounted thereon, the disk-wheel rigidly mounted on said sleeve, the pin or pins projecting from the periphery of said wheel, the spring lying in the pathway of the disk-wheel and adapted to be compressed by the contact of said pin or pins, the seed-slides and spring, and the clutch mechanism for controlling the action of the disk-wheel, substantially as and for the purpose set forth.

2. In a planting-machine, the combination, with a rotating disk or operating-wheel provided with one or more projecting pins, as described, of an elliptic spring located underneath and in the pathway of said wheel, the seed-slides, the links for pivotally connecting said spring and slides, whereby the contact of the pin or pins set in the disk-wheel has the effect of compressing the spring and moving the slide to uncover the seed-openings in the bottoms of the seed-boxes, substantially as and for the purpose set forth.

3. In a two-row planting-machine, the combination, with the seed-boxes of the seed-slides, the outer ends of which pass under the exterior bottom of said boxes and normally close the seed-apertures in the same, of the elliptic spring and the links pivotally connecting said slides and spring, whereby the spring when compressed moves the slides to uncover the seed-openings and normally closes the same when the pressure is removed, substantially as and for the purpose set forth.

4. In a planting-machine, the combination, with the seed-boxes, of the transverse bar connecting the same, the seed-slides rabbeted in the upper side of said bar, the plate $C^3$, the elliptic spring, the links $d$ $d$ $d$ $d$, the disk-wheel provided with projecting pins, as described, the sleeve on which said wheel is mounted, and the driving-shaft, substantially as and for the purpose set forth.

5. In a planting-machine, the combination, with the driving-shaft, of the screw-threaded bolts for the vertical adjustment of said shaft, a crank-wheel rigidly secured on said shaft, the sulky-wheel and a crank-wheel rigidly secured to the hub thereof, the rod formed in two parts and connecting said crank-wheels, and the right and left threaded nut for adjustably joining the inner ends of said rod, substantially as and for the purpose set forth.

WILLIAM J. WALLIS.

Witnesses:
L. M. FREEMAN,
L. B. COUPLAND.